United States Patent Office 3,107,157
Patented Oct. 15, 1963

3,107,157
PURIFICATION OF ALKALI METAL
BOROHYDRIDES
Henry P. Johnston, Stillwater, Okla., assignor to Callery Chemical Company, Pittsburgh, Pa., a corporation of Pennsylvania
No Drawing. Filed July 6, 1955, Ser. No. 520,349
4 Claims. (Cl. 23—312)

This invention relates to a new and useful method for the purification of crude alkali metal borohydrides in general and more particularly it relates to a new and improved method for purifying sodium borohydride.

The alkali metal borohydrides are made in a variety of ways. However, in every instance several impurities are present in the crude borohydride obtained. These impurities consist of various by-products formed during the reaction. In the case of sodium borohydride, the impurities may consist of sodium methoxide, sodium trimethoxyborohydride, sodium tetramethoxyborate, sodium metaborate or hydrolysis products of sodium borohydride itself. Thus, crude sodium borohydride usually analyzes less than 25% pure. In order to remove the undesirable by-products contained in the crude product, the borohydride is extracted with an aliphatic amine or liquid ammonia. This extract is only about 80% pure borohydride which is not suitable for use in many applications where a high purity is required. Thus, repeated extractions may be necessary. These extraction procedures, however, often result in a non-uniform product. Banus and Gibb in United States Patent 2,542,746 describe a method for avoiding this difficulty by treating the crude sodium borohydride with a large excess of water. However, they state that if too large an excess is used a dihydrate of sodium borohydride is formed which is difficult to remove since the water reacts with the sodium borohydride. If a smaller amount of water is used, not as large a proportion of the impurities is removed. It would thus be highly desirable to perfect a method which requires no water to remove the impurities and which does not depend upon any critical excess of one material over another.

It is an object of this invention to provide a new and improved method for purifying crude alkali metal borohydrides, such as sodium borohydride, which is simple and economical to perform.

Another object is to provide a method for purifying crude sodium borohydride which is carried out in non-aqueous solvents and circumvents the objections of other prior art methods.

Other objects will become apparent as the invention is more fully disclosed hereinafter.

This new and improved method for purifying alkali metal borohydrides will be completely described in the specification and the novelty thereof will be particularly pointed out and distinctly claimed.

This invention is based upon the discovery that the additions to a solution of sodium borohydride in (1) ammonia, or (2) a lower aliphatic amine, or (3) morpholine or (4) pyridine, of a non-aqueous solvent such as a simple ether or benzene which is miscible with the borohydride solution but in which the borohydride is insoluble will precipitate a very pure form of sodium borohydride which can be recovered by filtration. This method eliminates the long and dangerous evaporation or distillation of solvents, leaves all impurities in solution, permits the recycle of all solvents after separation and results in a substantial saving of time and materials.

In one experiment, crude sodium borohydride of about 87% purity and pyridine were mixed and shaken until a saturated solution was obtained. The undissolved residue was removed by filtration. To the clear filtrate was added enough ether to cause all of the sodium borohydride to precipitate. The solid was removed by filtration and the purified sodium borohydride was freed of pyridine by heating under reduced pressure at 100° C. The product obtained had a purity in excess of 99%.

Other experiments showed that NaBH$_4$ can be precipitated from solutions of lower organic amines by the addition of benzene. The borohydride can also be precipitated from an ammonia solution by the addition of benzene provided the temperature is maintained above the freezing point of benzene. The final product has a purity in excess of 97%.

The procedure described can also be used to purify other crude alkali metal borohydrides of low purity such as potassium borohydride or lithium borohydride. However, suitable non-aqueous solvents must be used in which the borohydride is insoluble but which is miscible with the borohydride solution. Although the purification process is extremely simple, it is highly effective in increasing the purity of crude borohydrides.

Having thus described this invention fully and completely in accordance with the patent statutes, it should be understood that within the scope of the appended claims this invention may be practiced otherwise than as specifically described.

What is claimed and desired to be secured by Letters Patent of the United States is:

1. A method of purifying crude sodium borohydride which comprises adding to a saturated solution of said borohydride in a non-aqueous solvent in which said sodium borohydride is soluble selected from the group consisting of anhydrous ammonia, lower alkyl amines, morpholine and pyridine another non-aqueous solvent which is miscible with the borohydride solution but in which sodium borohydride is insoluble selected from the group consisting of benzene and ethers that contain only one ether linkage, and recovering the pure sodium borohydride which precipitates.

2. A method in accordance with claim 1 in which a saturated solution of sodium borohydride in a lower alkyl amine is treated with benzene.

3. A method of purifying crude sodium borohydride which comprises adding ethyl ether to a saturated solution of said borohydride in pyridine and separating the pure sodium borohydride which precipitates.

4. A method of purifying crude sodium borohydride which comprises adding to a saturated solution of said borohydride in a non-aqueous solvent in which said borohydride is soluble another non-aqueous solvent which is miscible with the borohydride solution but in which sodium borohydride is insoluble selected from the class consisting of benzene and ethers that contain only one ether linkage, and separating the pure sodium borohydride which precipitates.

References Cited in the file of this patent
UNITED STATES PATENTS

| | | |
|---|---|---|
| 2,461,661 | Schlesinger et al. | Feb. 15, 1949 |
| 2,534,533 | Schlesinger et al. | Dec. 19, 1950 |
| 2,720,444 | Banus et al. | Oct. 11, 1955 |
| 2,741,540 | Bragdon et al. | Apr. 10, 1956 |

OTHER REFERENCES

Progress Report, Contract NOa(s)9901, prepared by Metal Hydrides, Inc. for Bureau of Aeronautics, printed October 23, 1949, declassified November 5, 1953, 7 pages total, pages 1, 2, and 5 relied on.